US007388602B2

(12) United States Patent
Inoue et al.

(10) Patent No.: US 7,388,602 B2
(45) Date of Patent: Jun. 17, 2008

(54) DIGITAL CAMERA, METHOD OF CONTROLLING DIGITAL CAMERA, AND FILE SERVER

(75) Inventors: Yasuaki Inoue, Saitama (JP); Yoshinao Hiranuma, Matusdo (JP); Kyoichi Takano, Tokyo (JP); Hiroki Miura, Kawaguchi (JP)

(73) Assignee: Sanyo Electric Co., Ltd, Osaka (JP)

( * ) Notice: Subject to any disclaimer, the term of this patent is extended or adjusted under 35 U.S.C. 154(b) by 704 days.

(21) Appl. No.: 10/725,385

(22) Filed: Dec. 3, 2003

(65) Prior Publication Data

US 2004/0109066 A1 Jun. 10, 2004

(30) Foreign Application Priority Data

Dec. 6, 2002 (JP) ............................. 2002-356084

(51) Int. Cl.
*H04N 5/225* (2006.01)
(52) U.S. Cl. ................................. 348/207.99
(58) Field of Classification Search .............. 348/211.3, 348/211.1, 211.2, 207.1, 552, 231.2, 231.6; 725/105; 358/403
See application file for complete search history.

(56) References Cited

U.S. PATENT DOCUMENTS

| 6,204,877 | B1* | 3/2001 | Kiyokawa ................ 348/211.3 |
| 6,300,976 | B1* | 10/2001 | Fukuoka ................ 348/231.99 |
| 6,642,959 | B1* | 11/2003 | Arai ........................ 348/231.3 |
| 6,774,935 | B1* | 8/2004 | Morimoto et al. ........ 348/211.5 |
| 6,812,961 | B1* | 11/2004 | Parulski et al. ........... 348/231.2 |
| 6,930,709 | B1* | 8/2005 | Creamer et al. ........... 348/211.3 |
| 7,154,534 | B2* | 12/2006 | Seki et al. ................ 348/207.1 |
| 7,221,391 | B2* | 5/2007 | Yamagishi ................ 348/222.1 |

| 2002/0028672 | A1* | 3/2002 | Qi et al. ........................ 455/414 |
| 2002/0053087 | A1* | 5/2002 | Negishi et al. ................. 725/99 |
| 2002/0175211 | A1 | 11/2002 | Dominquez et al. |

FOREIGN PATENT DOCUMENTS

| JP | 10-276391 | 10/1998 |
| JP | 10-336238 | 12/1998 |

(Continued)

OTHER PUBLICATIONS

Chinese Office Action with English translation issued in corresponding Chinese Patent Application No. 2003101201033, dated Jan. 26, 2007.

(Continued)

*Primary Examiner*—Lin Ye
*Assistant Examiner*—Amy Hsu
(74) *Attorney, Agent, or Firm*—McDermott Will & Emery LLP

(57) ABSTRACT

Digital cameras which improve operability in checking, storing, and editing shot images have not been satisfactory. A digital camera and a user terminal including a file server are connected over a network. When the digital camera is powered on, it automatically establishes a network connection with the file server in an activation process. When the digital camera shoots an image, this image is transmitted to the file server automatically upon completion of the encoding and compression of the image. When image reproduction is instructed from the digital camera, the image is downloaded from the file sever over the network and displayed on the digital camera.

6 Claims, 12 Drawing Sheets

FOREIGN PATENT DOCUMENTS

| | | |
|---|---|---|
| JP | 11-069326 | 3/1999 |
| JP | 11-275425 | 10/1999 |
| JP | 2001-069384 | 3/2001 |
| JP | 2002-051240 | 2/2002 |
| JP | 2002-290796 A | 10/2002 |
| WO | WO 00/33562 | 6/2000 |
| WO | WO 01/45388 A2 | 6/2001 |

OTHER PUBLICATIONS

Japanese Office Action, with English Translation issused in corresponding Japanese Patent Application No. JP 2002-356084, mailed on Nov. 6, 2007.

* cited by examiner

DIGITAL CAMERA, METHOD OF CONTROLLING DIGITAL CAMERA, AND FILE SERVER

BACKGROUND OF THE INVENTION

1. Field of the Invention

The present invention relates to a digital camera, a technology of controlling the same, and a file server. In particular, the invention relates to a digital camera having a processing block which applies processing to an image, a method of controlling the same, and a file server for exchanging images with the digital camera.

2. Description of the Related Art

Digital cameras are hot sellers in recent years which have created a big market. The volume of shipments of digital cameras in Japanese market in 2001 exceeded that of film cameras. In 2002, the total volume of shipments worldwide is expected to reach 20 million or so. Among the factors behind this is handiness which includes the absence of need for film loading, easy storing of image data, and easy photoprint available at home when needed. These are privileges of digital technology. For an application of the digital technology, Japanese Patent Laid-Open Publication No. Hei 10-276391 proposes a technique for transmitting images from an electronic still camera to a plurality of destinations easily.

Digital cameras do show high convenience in actual use, though with room for improvement obviously. For example, shot images are typically reproduced on the LCDs of the digital cameras for checking. Nevertheless, the LCDs are limited in size due to the digital camera casings, and thus are far from being an environment optimum for checking.

Since digital cameras require no film and thus are free of care for misshots, users often take a number of shots in an identical scene for the sake of choice later. Displaying a plurality of images on the LCD of a digital camera, however, shrinks the individual images, in which case the pictures are hard to compare and choose. On the other hand, printing all the pictures without choice leads to higher cost. Not printing but storing alone also raises the cost of the recording media. Moreover, greater accumulation of images makes it difficult to search for desired images. Despite being freed from films, digital cameras eventually leave some to be desired in terms of image checking, storing, search, reproduction, printing, etc.

These problems are essentially ascribable to the fact that digital cameras have not yet maximized the advantages of the digital technology, including simplicity, quick operation, and low costs.

SUMMARY OF THE INVENTION

The present invention has been achieved in view of the current circumstances. It is thus an object of the present invention to provide a digital camera for maximizing the advantages of the digital technology, a method of controlling the same, and a file server intended for the digital camera.

One of the aspects of the present invention relates to a digital camera, which comprises: an image pickup block; a mechanism control block which controls the image pickup block mechanically; an operation block which inputs a user operation; and a processing block which applies processing to an image. For example, the processing block includes any one of the following configurations:

(1) A detecting unit which detects an activation request for the digital camera, and a communication control unit which performs processing for establishing a network connection with a file server upon detection of the activation request;

(2) A detecting unit which detects an image pickup request, and a communication control unit which performs processing for transmitting an image obtained by image pickup to a file server over a network upon obtainment of the image;

(3) A detecting unit which detects an image reproduction request, and a communication control unit which performs processing for receiving an image to be reproduced from a file server over a network when the image reproduction request is detected; and (4) Any two or more of the configurations (1) to (3) in combination.

In this case, the detecting units as well as the communication units may be integrated with or separated from each other. Similarly, any members having the same name in this specification may hereinafter be configured integrally or separately.

The "activation request" is one by which the digital camera is activated in one way or another, such as by turning on the power and by recovery from standby. The "network" may be either wireless or wired. Nor does matter whether the network uses such facilities as an access point as if on a wireless LAN in infrastructure mode, or is of so-called peer-to-peer as if in ad-hoc mode. The "file server" may be a network node of any architecture as long as it exchanges images with the digital camera. The "communication control unit" shall apply to both the cases where it performs communication by itself and where it controls a communication unit such as an additional communication card and makes no communication by itself. The "image obtained by image pickup" shall cover both an intact image just picked up and an image obtained through compression or the like after picked up.

The various types of processing by the communication control unit are activated automatically without explicit user instructions at least in some operation mode. Even without particular user operations, the file server can thus be used to store images into the file server and to acquire images from the file server for display on the digital camera, or as if it is a recording medium built in the digital camera. This enhances user convenience or allows a reduction in the capacity of the recording apparatus to be built in the digital camera.

Another aspect of the present invention relates to a method of controlling a digital camera, which comprises: detecting an activation request for a digital camera; and establishing a network connection between the digital camera and a file server upon detection of the activation request.

Another aspect includes: detecting an image pickup request for a digital camera; and performing processing for transmitting an image obtained by image pickup to a file server over a network upon obtainment of the image.

Still another aspect includes: detecting an image reproduction request for a digital camera; and performing processing for receiving an image to be reproduced from a file server over a network when the image reproduction request is detected.

Of the foregoing three aspects, any two or more may be performed in combination.

Still another aspect includes: checking a digital camera for the presence or absence of at least one among a buffer memory intended for temporarily image retention, a recording device intended for more permanent image retention, and a communication unit which makes a file server retain an image over a network; designating a storing destination of an image obtained by image pickup depending on the check result; and storing the image obtained by image pickup into the storing destination designated. The buffer memory, the recording device, and the communication unit are each mounted on the digital camera fixedly or detachably. For example, the buffer memory is a fixed memory, the recording device a memory card, and the communication unit a communication card. The "more permanent" refers to having properties suited to data storage with greater capacity, lower price per bit, and higher storage security in terms of volatility and the like.

In this aspect, for example, images are stored in the following order of priority.

(1) When the communication unit, the recording device, and the buffer memory are all present:

Case 1: the communication unit is given the first priority, the recording device the second, and the buffer memory the third. In this case, since images can be stored into the file server over the network, it is possible to eliminate the recording apparatus inside the digital camera or reduce the capacity thereof.

Case 2: the recording device is given the first priority, the communication unit the second, and the buffer memory the third. In this case, the processing time can be reduced due to the storing to the local recording device. When the recording device is detected to be full, remaining images may be stored into the file server. Idling time and the like of the digital camera may be used to transfer the images stored in the recording device to the file server via the communication unit so that the recording device has greater free space.

Case 3: the buffer memory is given the first priority, either one of the communication unit and the recording device the second, and the other the third. In this case, images can be accumulated easily even in continuous shooting since the images can be stored into the buffer memory which is typically high in writing speed. As in the case 2, idling time and the like may be used to transfer the images stored in the buffer memory to the file server or the recording device so that the buffer memory has greater free space.

(2) When not the communication unit but the recording device and the buffer memory are present:

If priority is given to the recording device, it is possible to store a greater number of images since the recording device typically has a capacity greater than that of the buffer memory. On the other hand, giving priority to the buffer memory facilitates writing and reading images at high speed.

(3) When not the recording device but the communication unit and the buffer memory are present:

If priority is given to the communication unit, it is possible to store a greater number of images since the file server typically has a capacity greater than that of the buffer memory. On the other hand, giving priority to the buffer memory facilitates writing and reading images at high speed.

(4) When not the buffer memory but the communication unit and the recording device are present:

The same effects as those of the cases 1 and 2 in (1) are obtained.

Still another aspect of the present invention includes: detecting a predetermined operation not directly intended for image storing, such as an activation operation and shooting operation of a digital camera; and transferring an image saved in a buffer memory of the digital camera to a recording apparatus more permanent than the buffer memory, such as a memory card loaded in the digital camera and a file server, when the predetermined operation is detected. According to this aspect, images can be stored permanently through background processing without deliberate user instructions for image storing.

Still another aspect of the present invention is a file server available to store images of a digital camera. The file server comprises a communication unit and a control unit, the control unit including: a file management unit which stores an image file when the communication unit receives the image file over a network; and a reproduction processing unit which reproduces the image file for screen display upon reception of the image file. Since this file server not only stores but also reproduces the image file upon reception, the image can be checked quickly.

Incidentally, any combinations of the foregoing components, and the expressions of the present invention converted among methods, apparatuses, systems, computer programs, recording media, and the like are also intended to constitute applicable aspects of the present invention.

DETAILED DESCRIPTION OF THE PREFERRED EMBODIMENT

Figure 1:
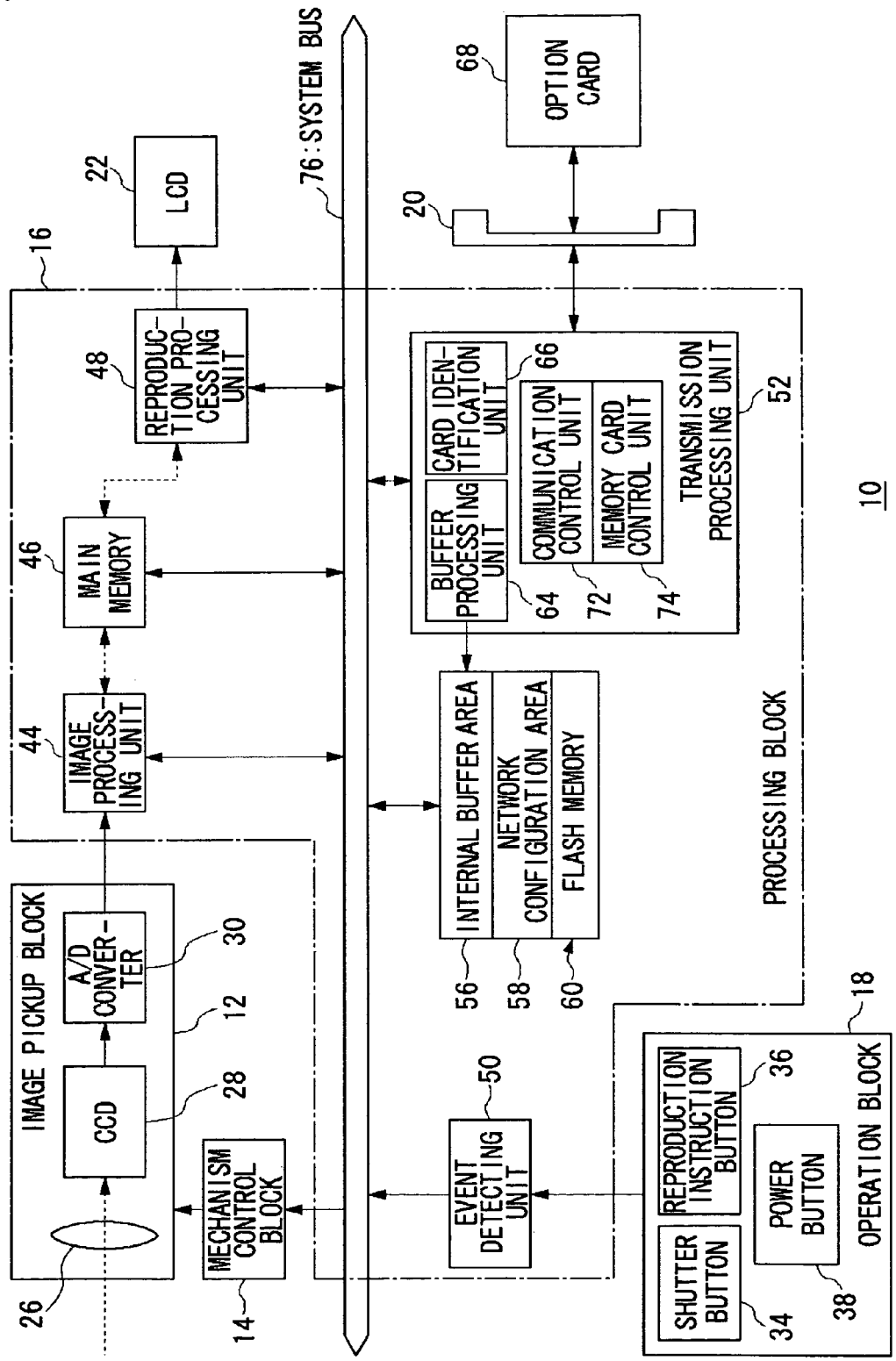
FIG. 1 is a block diagram of a digital camera according to an embodiment.

FIG. 1 shows the configuration of a digital camera 10 according to an embodiment. The digital camera 10 includes an image pickup block 12, a mechanism control block 14, a processing block 16, an operation block 18, an LCD 22, and a card slot 20. The image pickup block 12 shoots a subject under user instructions. The mechanism control block 14 exercises mechanical controls over the image pickup block 12, including zooming, focusing, and aperture setting. The processing block 16 applies various types of processing to an image shot by the image pickup block 12. The operation block 18 inputs user instructions and transmits the same to the processing block 16. The LCD 22 reproduces and displays an image. The card slot 20 retains an option card 68 detachably. These components exchange data and commands with one another via a system bus 76.

Of these components, the processing block 16 in particular is realized, in terms of hardware, by a CPU, an image processing LSI, various memory devices, etc. In terms of software, the processing block 16 is achieved by an image processing program, a memory or buffer control program, an option card control program, a user interface program, and the like. The foregoing blocks are in units of functions to be achieved by the cooperation of the hardware and software, but not necessarily in one-to-one correspondence with actual devices.

Besides, it will be readily understood by those skilled in the art that the configuration of FIG. 1 has a considerably high degree of flexibility as to which part is realized in hardware or software, and various modifications are covered by the present invention. Incidentally, the mechanism control block 14 may be realized by a dedicated CPU or achieved by sharing the CPU of the processing block 16.

The image pickup block 12 includes a lens 26, a CCD 28, and an A/D converter 30. The lens 26 forms the image of a subject on the CCD 28. The CCD 28 outputs the image to the A/D converter 30 as an analog image signal. The A/D converter 30 subjects this signal to A/D conversion to output digital image data to the processing block 16. A not-shown diaphragm, and a mechanical shutter in some cases, is/are placed between the lens 26 and the CCD 28. In addition, a not-shown signal processing unit is interposed between the CCD 28 and the A/D converter 30 so that such processing as a white balance adjustment is performed on each of R, G, and B signals.

The processing block 16 comprises an image processing unit 44, a main memory 46, a reproduction processing unit 48, an event detecting unit 50, a transmission processing unit 52, and a flash memory 60. The image processing unit 44 inputs the image data output from the image pickup block 12, and encodes and compresses the same according to a JPEG (Joint Photographic Experts Group) scheme or the like. The reproduction processing unit 48 decompresses the image under user instructions, and outputs the resultant to the LCD 22. The main memory 46 is used as a work area in compressing and decompressing images, as well as a resident area for a variety of control programs. The event detecting unit 50 detects user instructions input from the operation block 18 as events. The transmission processing unit 52 stores images that are shot and compressed, to a designated storing destination. The transmission processing unit 52 also reads images to be reproduced from the destination. The flash memory 60 includes an internal buffer area 56 (hereinafter, referred to as "buffer 56") for functioning as an internal buffer, and a network configuration area 58 for storing network configuration information such as the IP addresses of the digital camera 10 and a file server to be described later. A network connection will be established on the basis of the network configuration information. The event detecting unit 50 detects the user instructions to the operation block 18 by such means as software polling, hardware-based button press signals, and interruption processing resulting from the signals.

The transmission processing unit 52 includes a buffer processing unit 64, a card identification unit 66, a communication control unit 72, and a memory card control unit 74. The buffer processing unit 64 reads and writes image data from/to the buffer 56. It also determines whether or not any image is saved in the buffer 50. For the sake of read and write, the buffer processing unit 64 has a memory control circuit intended for the buffer 56. Whether an image is saved or not can be indicated by such means as flagging the presence or absence of significant data in each of small image-storing subareas of the buffer 56, or storing an image in an image file formant with the presence or absence of the image shown in its header region. The buffer processing unit 64 thus determines, by software, whether an image is saved or not;

The card identification unit 66 identifies the type of the option card 68 loaded in the card slot 20. The identification can be effected by reading a card ID stored in the system register inside the option card 68, or by determining the card ID from the combination of pins powered or grounded inside the option card 68.

The communication control unit 72 exercises control necessary to communicate with the file server by using the option card 68 loaded in the card slot 20 if the option card 68 is a communication card. The communication control unit 72 includes a communication driver IC and a driver program, for example. The memory card control unit 74 controls the read and write of image data from/to the option card 68 loaded in the card slot 20 if the option card 68 is a memory card. For example, the memory card control unit 74 includes a data transmission circuit conforming to the general-purpose bus specification of the card slot 20.

The operation block 18 includes a shutter button 34, a reproduction instruction button 36, and a power button 38. When the shutter button 34 is pressed, the instruction is transmitted through the event detecting unit 50 and the mechanism control block 14 to the image pickup block 12 for image shooting. When the reproduction instruction button 36 is pressed, the instruction is issued to the reproduction processing unit 48 through the event detecting unit 50. The reproduction processing unit 48 decompresses an image which has been compressed at the time of storing, and outputs the resultant to the LCD 22. Hereinafter, an image compressed by the image processing unit 44 will be referred to as "compressed image" when distinction is necessary. The compressed image is read from the buffer 56, a memory card which is the option card 68, or the file server. Before a compressed image in the main memory 46 is stored into any of those three locations, the compressed image is read from the main memory 46 for reproduction.

The power button 38 is one for switching on/off the power of the entire digital camera 10. When the digital camera 10 is off, pressing the power button 38 is detected by the event detecting unit 50 as an activation request, which is followed by an activation process. When the digital camera 10 is on, pressing the power button 38 is detected by the event detecting unit 50 as a termination request, which is followed by the processing for turning off the digital camera 10.

Figure 2:
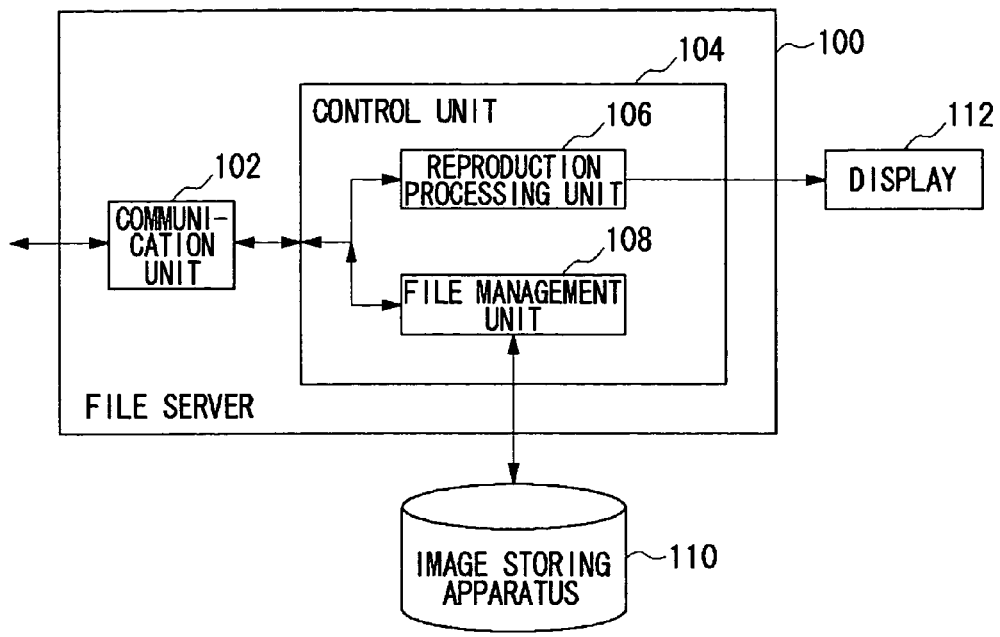
FIG. 2 is a block diagram of a file server according to the embodiment.

FIG. 2 shows the configuration of a file server 100 which exchanges image data with the digital camera 10. The file server 100 comprises a communication unit 102 for communicating with the digital camera 10 over a network, and a control unit 104 for controlling the entire file server 100. The control unit 104 has a reproduction processing unit 106 and a file management unit 108. When a compressed image sent from the digital camera 10 is received by the communication unit 102, the receiving operation triggers the reproduction processing unit 106 to decompress the compressed image and display the resultant image on a display 112. The receiving operation also triggers the file management unit 108 to store the compressed image into an image storing apparatus 110. The reproduction processing unit 106 and the file management unit 108 both operate automatically without any manual operation. In order for compressed images transmitted from a plurality of digital cameras 10, or a plurality of users, to be displayed and managed separately, the reproduction processing unit 106 creates user-specific display windows by known methods, so that images of the users are displayed on the respective display windows. Similarly, to store the images of the users separately, the file management unit 108 creates user-specific folders in the image storing apparatus 110 by known methods, so that the images are classified and stored in the folders.

Figure 3:
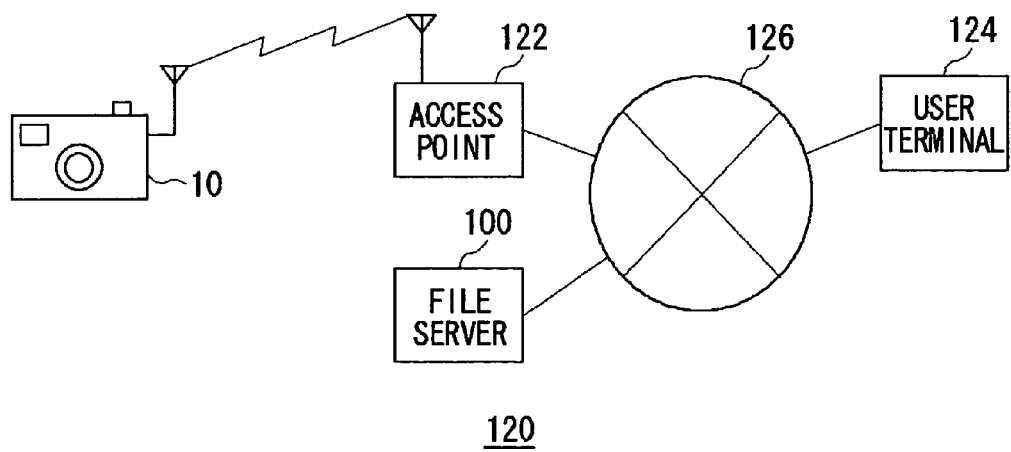
FIG. 3 is a block diagram of a file management system which is composed of the digital camera and the file server according to the embodiment.

FIG. 3 shows the configuration of a file management system 120 which is composed of the digital camera 10 and the file server 100. Here, an access point 122 for the digital camera 10 to use for communication is connected with the file server 100 and an user terminal 124 over the Internet 126. The digital camera 10 and the access point 122 communicate with each other over a wireless LAN. According to this configuration, images shot by the user with the digital camera 10 are accumulated into the file server 100 via the access point 122 and the Internet 126. The user terminal 124 can download necessary images from the file server 100 when required. Note that the file server 100 may be constructed inside the user terminal 124. In this case, the images shot by the user with the digital camera 10 are displayed on the user terminal 124 through operations to be described later successively with greater convenience.

Figure 4:
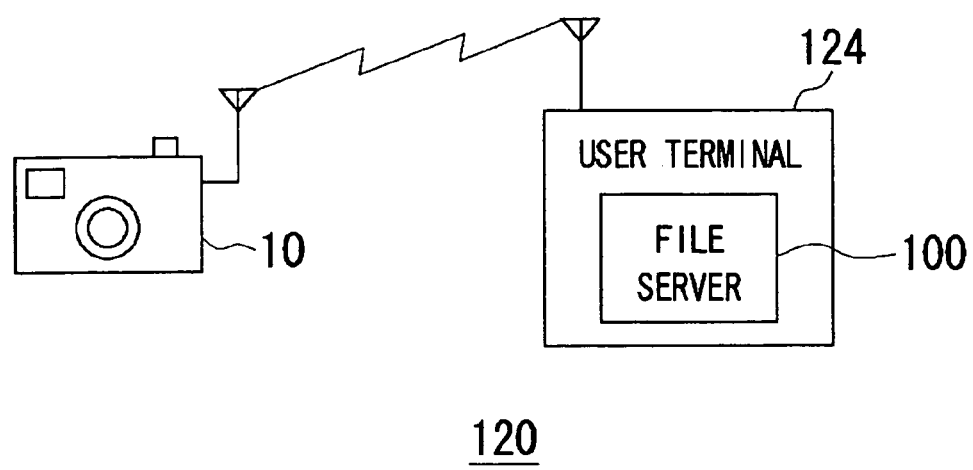
FIG. 4 is a block diagram showing another configuration of the file management system.

FIG. 4 shows another configuration the file management system 120. Here, the digital camera 10 and the file server 100 are connected with each other over a wireless LAN in ad-hoc mode. The file server 100 is constructed inside the user terminal 124. This configuration makes the access point 122 and the Internet 126 in FIG. 3 unnecessary. Thus, for example, the user can carry the digital camera 10 and the user terminal 124, a note PC, together so that images shot by the digital camera 10 are checked on the user terminal 124 through operations to be described later successively.

Description will now be given of the operations according to the foregoing configurations. The present embodiment is characterized in that the images shot by the digital camera 10 are transmitted to the file server 100 in succession, and are stored therein and displayed successively. For example, when the user uses the file management system 120 of FIG. 3, the shot images can thus be checked on the display 112 of FIG. 2 efficiently, not necessarily on the LCD 22 of the digital camera 10, a display of relatively small screen. That is, the file server 100 is used as the recording medium of the digital camera 10 to fully utilize the abundant storage capacity and greater display screen thereof. When the user wishes to view an image on the digital camera 10, the necessary image is downloaded from the file server 100 to the digital camera 10 according to the reproduction instruction, and reproduced on the LCD 22 of the digital camera 10. This leads to cost advantage since the digital camera 10 need not incorporate large memories for storing a number of images.

Now, if the option card 68 loaded in the card slot 20 of the digital camera 10 is not the communication card, the communication with the file server 100 is impossible. In this case, the digital camera 10 stores shot images to a memory card if the memory card is loaded as the option card 68. Moreover, images to be reproduced are also loaded from this memory card and displayed on the LCD 22. When neither the memory card nor the communication card is loaded as the option card 68, the digital camera 10 stores an image into the buffer 56 which is temporary saving means. Hence, the buffer 56 has only to have a minimum memory capacity necessary for such a saving process. The image saved to the buffer 56 is transferred to the file server 100 next time the communication with the file server 100 is enabled, or transferred to a memory card when this card is loaded. As a result, the buffer 56 regains free space in preparation for the next saving process.

Figure 5:
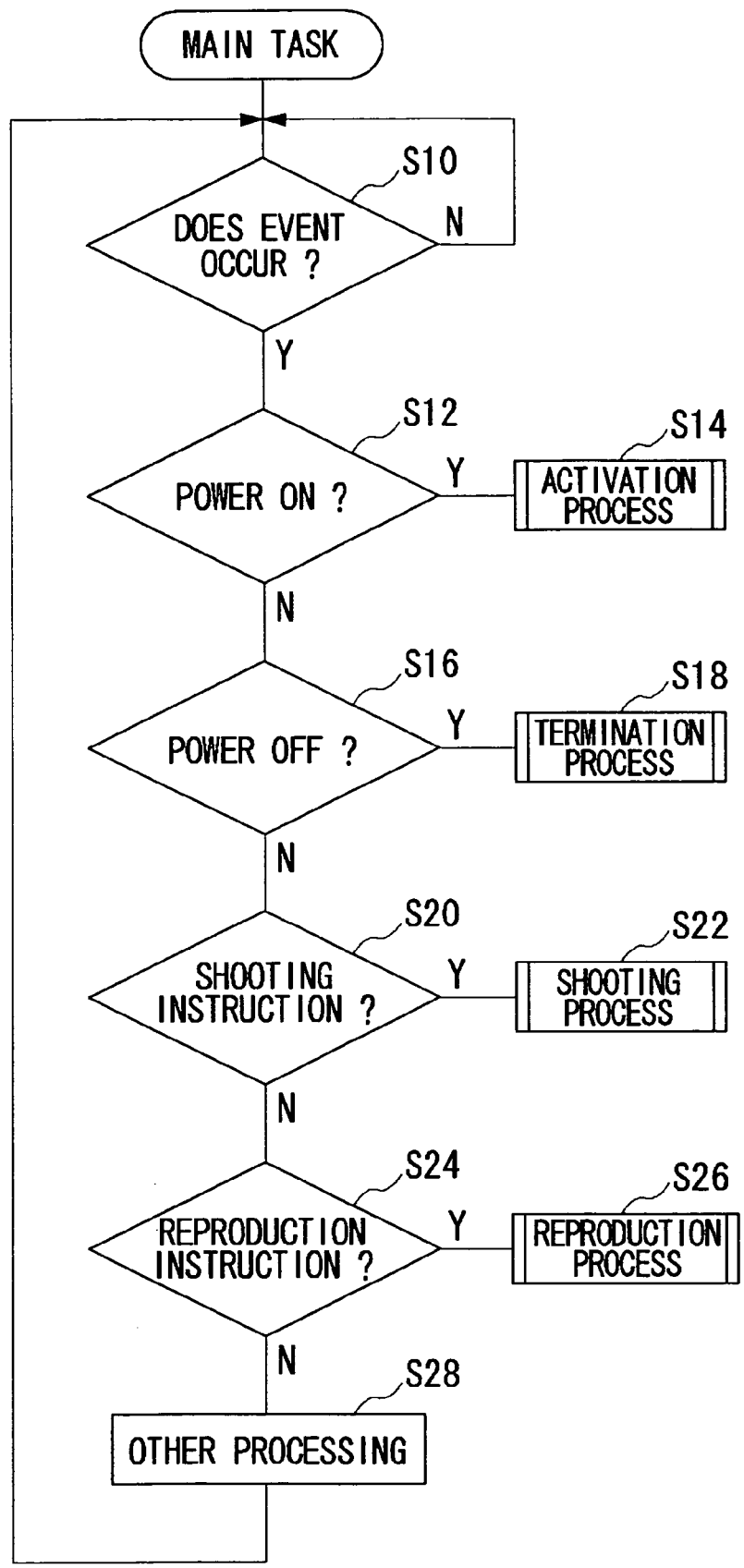
FIG. 5 is a flowchart showing the processing of a main task of the digital camera.

FIG. 5 shows the processing flow of a main task of the digital camera 10. Here, the main task shall be run even when the power of the digital camera 10 is off, and the pressing of the power button 38 be detected as an event. Consequently, the event detecting unit 50 keeps monitoring the occurrence of an event regardless of whether the power of the digital camera 10 is on or off (N at S10). If a button operation occurs in the operation block 18, the event detecting unit 50 detects the event (Y at S10). The event detecting unit 50 identifies the type of the occurring event. If the event is "power-on," i.e., the power button 38 is pressed when the power of the digital camera 10 is off (Y at S12), an activation process is performed (S14).

If the event is not "power-on" (N at S12) but "power-off," i.e., the power button 38 is pressed when the power of the digital camera 10 is on (Y at S16), a termination process is performed (S18). If the event is not "power-off" (N at S16) but a "shooting instruction," i.e., the shutter button 34 is pressed (Y at S20), a shooting process is performed (S22). If the event is not the "shooting instruction" (N at S20) but a "reproduction instruction," i.e., the reproduction instruction button 36 is pressed (Y at S24), a reproduction process (S26) is performed. If not the "reproduction instruction" (N at S24), other processing according to the user instruction is performed (S28). Incidentally, while the main task here is assumed to be active even when the power of the digital camera 10 is off, the main task may be activated during the activation process (S14).

Figure 6:
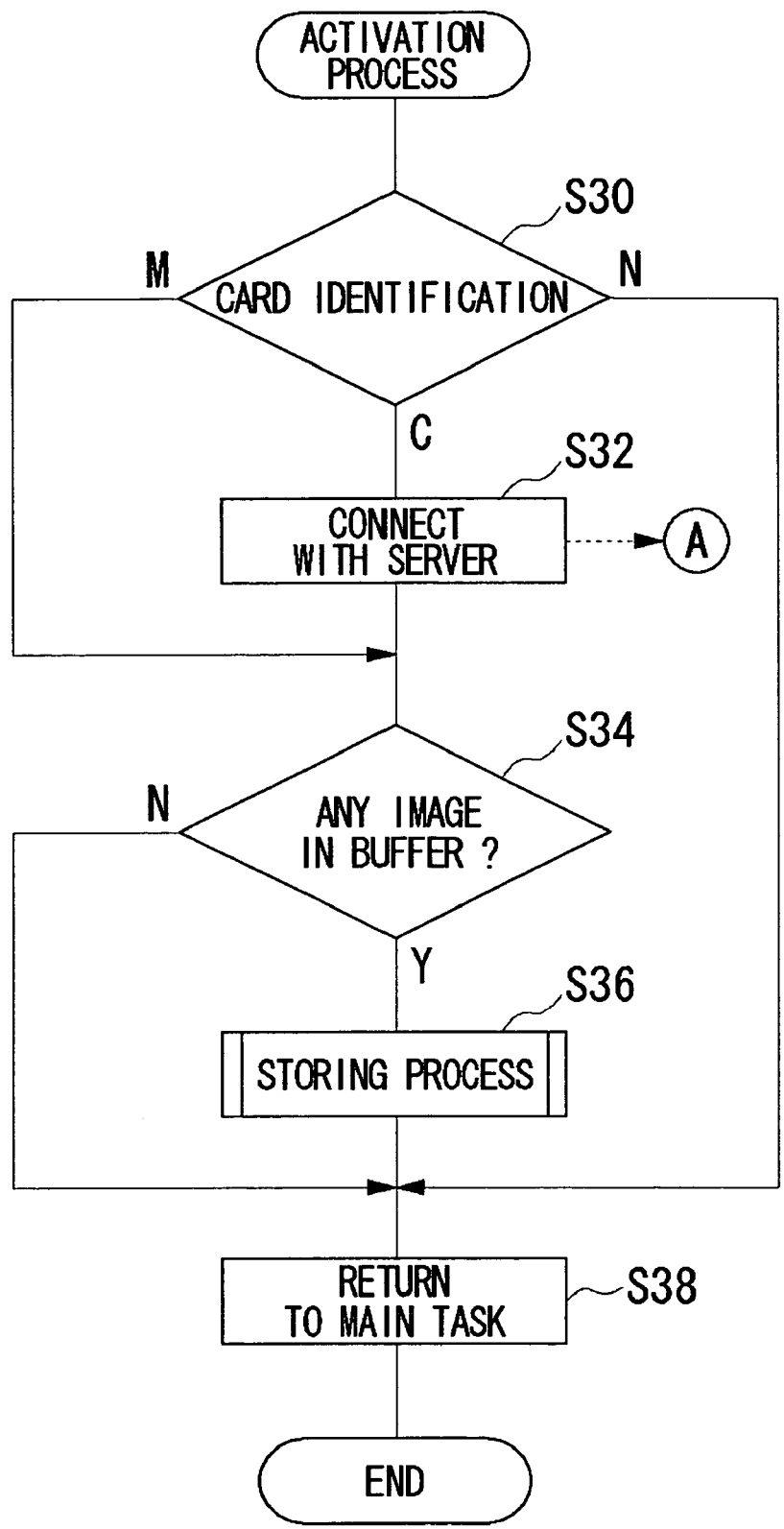
FIG. 6 is a flowchart of an activation process of the digital camera.

FIG. 6 shows the processing flow of the activation process (S14). Initially, the card identification unit 66 identifies the type of the option card 68 loaded in the card slot 20 (S30). If the card slot 20 is loaded with a communication card (C at S30), the communication control unit 72 and the communication card cooperate to establish a network connection with the file server 100 (S32). Subsequently, it is determined whether or not an image is saved in the buffer 56 (S34). If saved (Y at S34), the process for storing the image is performed (S36) before returning to the main task (S38).

If the identification of the card type at S30 determines that the card slot 20 is loaded with a memory card (M at S30), the processing of S32 is skipped since the network connection with the file server 100 is impossible. The storing process is performed depending on the presence or absence of an image saved in the buffer 56 before returning to the main task (S34, S36, S38).

If the identification of the card type at S30 determines that the card slot 20 is loaded with no option card 68 (N at S30), no special processing is performed before returning to the main task (S38). Consequently, given that an image is saved in the buffer 56 here, this state is maintained. In any case, the activation process is terminated by returning to the main task.

Figure 7:
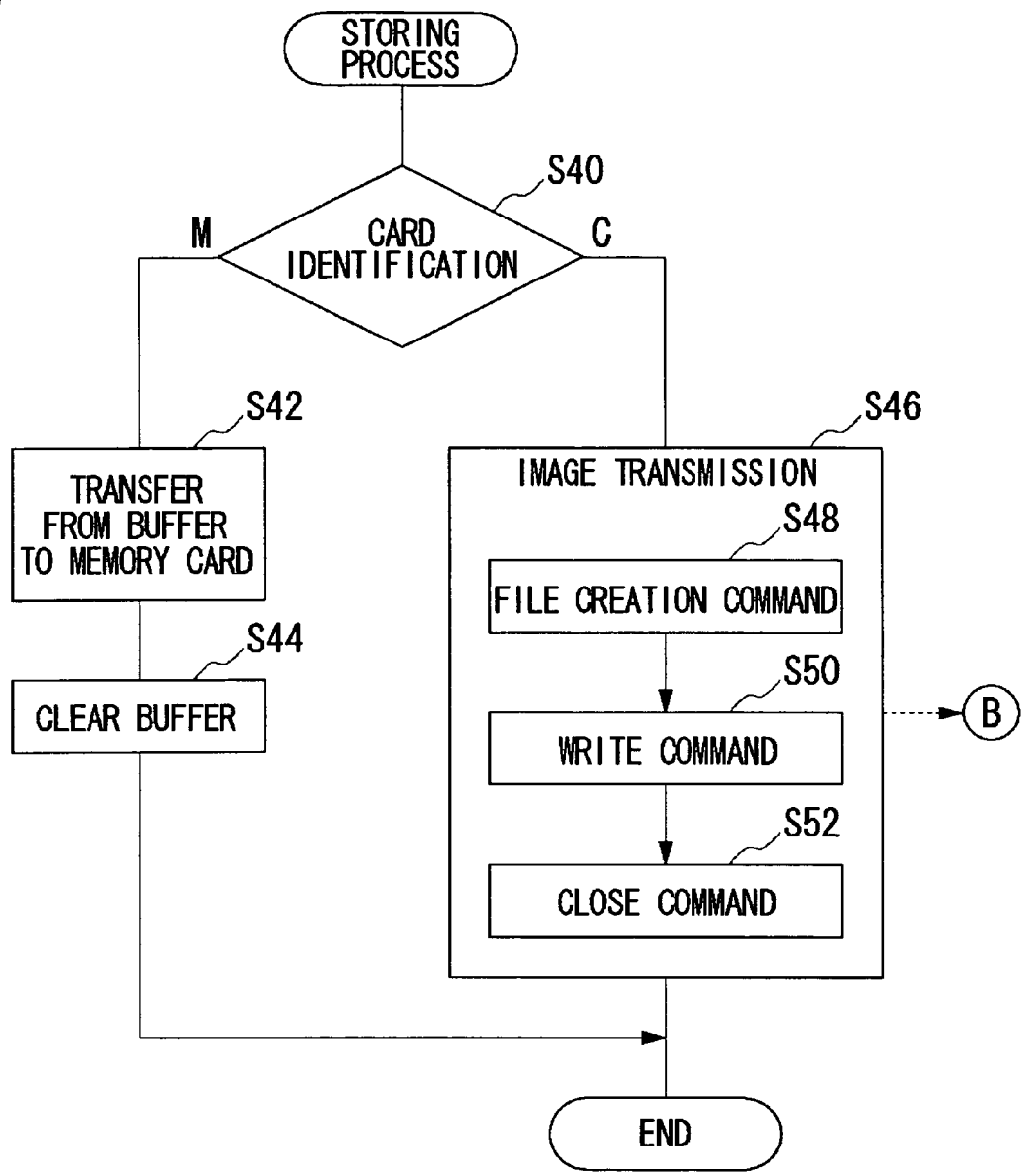
FIG. 7 is a flowchart of a storing process of the digital camera.

FIG. 7 shows the processing flow of the storing process (S36) of FIG. 6. Initially, the card identification unit 66 performs card identification (S40). If the card slot 20 is loaded with a memory card (M at S40), the image is transferred from the buffer 56 to the memory card (S42). The buffer 56 is then cleared of the area that has been used for the transmitted image. This produces free space in the buffer 56. On the other hand, if the card identification determines that a communication card is loaded (C at S40), the image in the buffer 56 is transmitted to the file server 100 (S46). For that purpose, a file creation command, or a command to create a file by which the file server 100 accepts the image, is transmitted (S48). Then, the image data is transmitted along with a write command (S50). After the completion of the data transmission, a close command is transmitted (S52) so that the image is stored on the file server 100 as a single image file.

Figure 8:
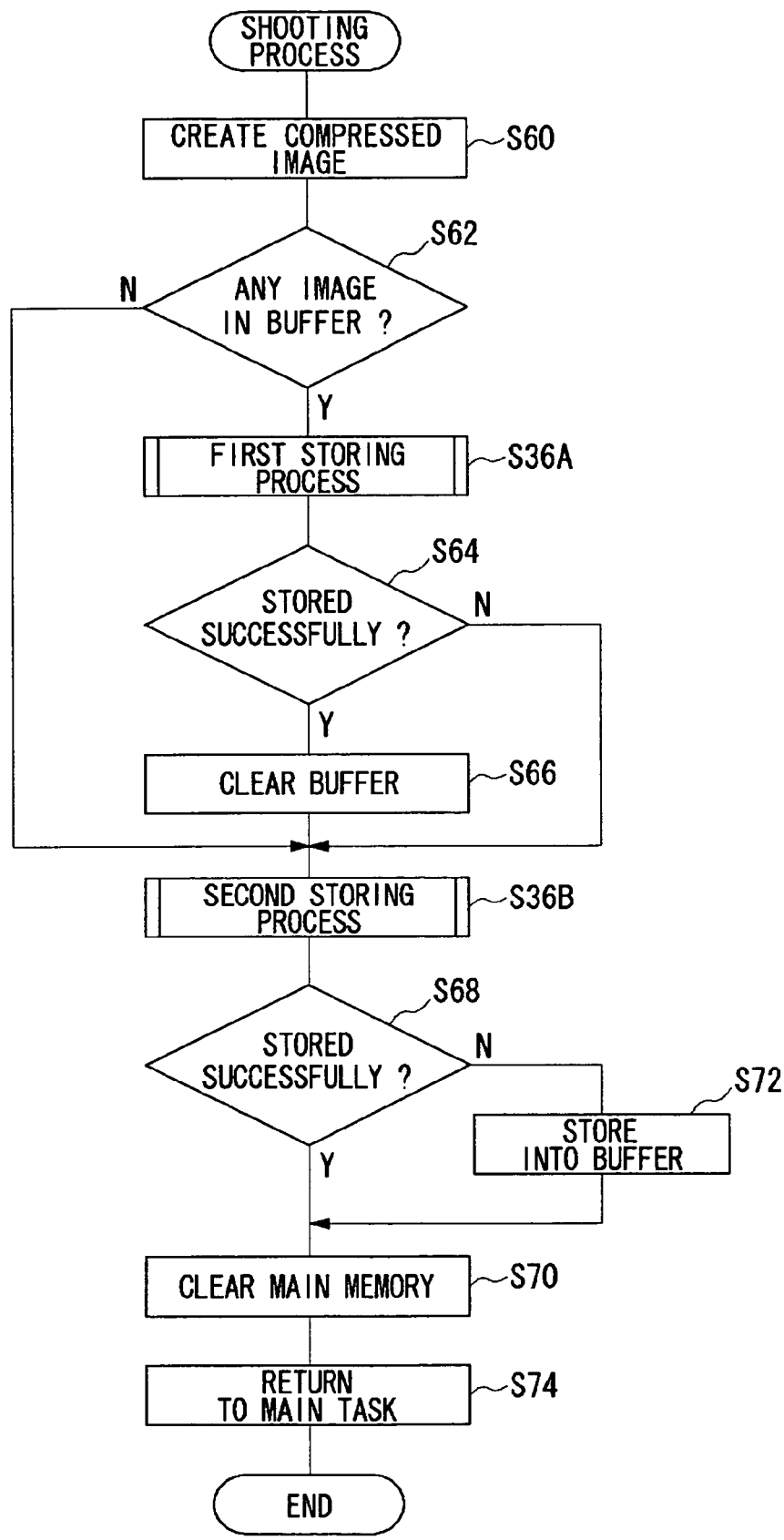
FIG. 8 is a flowchart of a shooting process of the digital camera.

FIG. 8 shows the processing flow of the shooting process (S22) of FIG. 5. This flow is characterized by that if an image is already saved in the buffer 56 upon an image shot, the saved image is first subjected to the storing process before the image shot newly is subjected to the storing process.

When the user presses the shutter button 34, the shooting instruction is transmitted through the event detecting unit 50 to the mechanism control block 14. The shot image is transmitted from the image pickup block 12 to the image processing unit 44. The image processing unit 44 performs image encoding and compression by using the main memory 46 as a work area, thereby generating a compressed image (S60).

Next, the buffer processing unit 64 determines whether or not any image is saved in the buffer 56 (S62). If saved (Y at S62), a "first storing process" or the storing process for the first time is performed (S36A). The first storing process is the same as the storing process shown in FIG. 7, whereas it is targeted for the image saved in the buffer 56. If the image is stored successfully (Y at S64), the buffer 56 is cleared of the area where the image has been stored (S66). Then, the processing moves to a "second storing process" or the storing process for the second time (S36B). If the storing fails (N at S64), the processing of S66 is skipped. The second storing process is also the same as the storing process of FIG. 7, whereas it is targeted for the shot image this time. If this image is stored successfully (Y at S68), the main memory 46 is cleared of the area where the shot image has been placed as a compressed image (S70). On the other hand, if the storing fails (N at S68), the compressed image placed in the main memory 46 is stored into the buffer 56 by the action of the buffer processing unit 64 (S72), and then the area of the main memory 46 where the compressed image has been placed is cleared (S70). Subsequently, the processing returns to the main task (S74), exiting the shooting process.

Incidentally, if it is determined at S62 that no image is saved in the buffer 56 (N at S62), the second storing process (S36B) and the subsequent are performed since what must be stored is the shot image alone. The reason why the determination must be made at S64 and S68 as to the success or failure of the storing is that when the image is transmitted to the file server 100 over the network, the image transmission may fail depending on the condition of the network connection.

Figure 9:
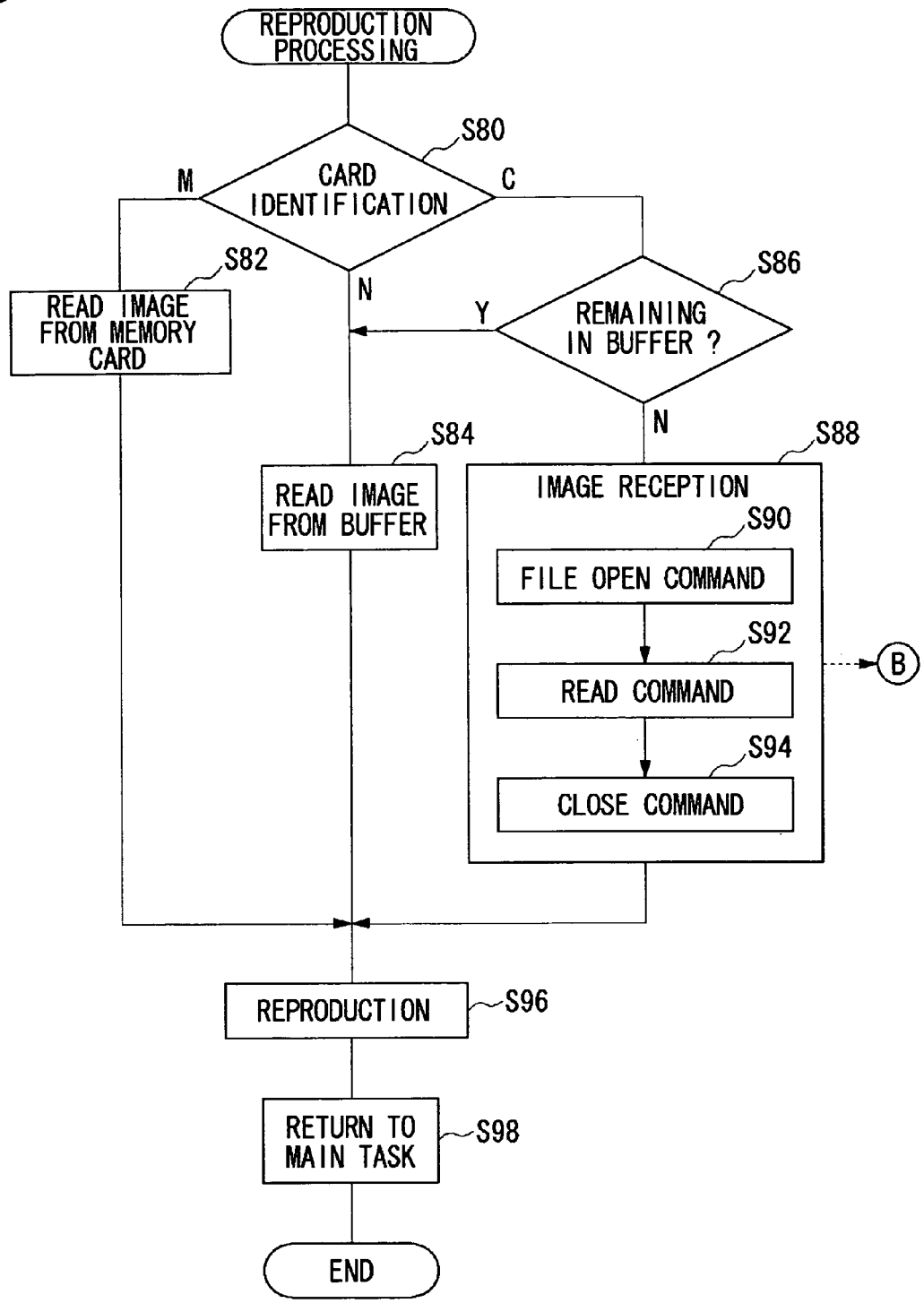
FIG. 9 is a flowchart of a reproduction process of the digital camera.

FIG. 9 shows the processing flow of the reproduction process (S26) of FIG. 5. Initially, the card identification unit 66 identifies the card type (S80). If the card slot 20 is loaded with a memory card (M at S80), an image is read from the memory card (S82). If the card slot 20 is loaded with a communication card (C at S80), it is determined whether or not the image about to be reproduced (hereinafter, also referred to as "image to be reproduced" if needed) remains in the buffer 56 (S86). If it remains (Y at S86), the image is read from the buffer 56 (S84). If the image to be reproduced is no longer in the buffer 56 (N at S86), the image is received from the file server 100 (S88). For that purpose, a command for opening the file of the desired image is transmitted (S90), and then a command for reading the image data is transmitted (S92). After the read completes, a close command is transmitted (S94). At S80, if the option card 68 is determined to be absent (N at S80), the image is read from the buffer 56 (S84).

The image read by any one of the foregoing processes is placed in the main memory 46. The reproduction processing unit 48 decompresses this image and reproduces it on the LCD 22 (S96). Then, the processing returns to the main task (S98)

Note that this reproduction process has been described on the assumptions that: if there is a memory card, the image to be reproduced is stored in the memory card; if there is a communication card, the image to be reproduced is stored on the file server 100; if neither of the cards is present, the image to be reproduced is saved in the buffer 56; and if there is the communication card but the storing to the file server 100 has been failed, the image to be reproduced is saved in the buffer 56. Obviously, it is possible to assume various other cases, whereas the description has dealt with principal operations alone for the sake of avoiding complexity. Yet securer processing can be achieved simply by performing a read operation after the memory card, the buffer 56, and the file server 100 are searched for the image to be reproduced based on identification information capable of unique identification of the image.

Figure 10:
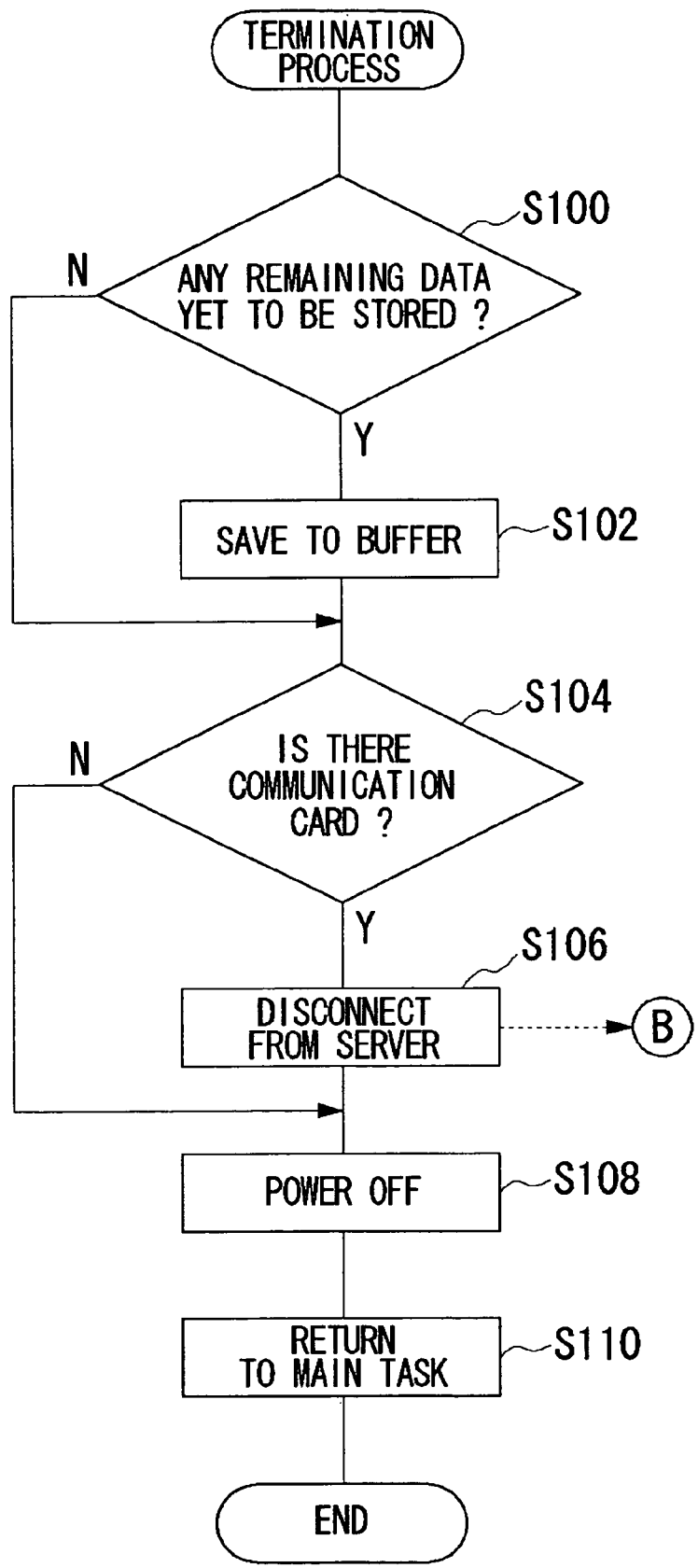
FIG. 10 is a flowchart of a termination process of the digital camera.

FIG. 10 shows the processing flow of the termination process (S18) of FIG. 5. Initially, the buffer processing unit 64 determines if any image data yet to be stored remains in the buffer 56 (S100). As employed herein, "stored" refers to the state where the image data is stored in the memory card or the file server 100, or at worst saved to the buffer 56. Thus, if there is data yet to be stored, the data typically lies in the main memory 46. In the presence of data yet to be stored (Y at S100), the data is saved from the main memory 46 to the buffer 56 by the action of the buffer processing unit 64 (S102). In the absence of data yet to be stored (N at S100), the processing of S102 is skipped simply.

Subsequently, the card identification unit 66 determines whether a communication card is loaded or not (S104). If loaded (Y at S104), the network connection with the file server 100 is disconnected (S106). If there is no communication card (N at S104), the processing of S106 is skipped simply. Subsequently, the event detecting unit 50 turns off the power (S108) to return to the main task (S110). Incidentally, the processing of S110 is simply skipped if the main task runs only when the power is on.

Figure 11:
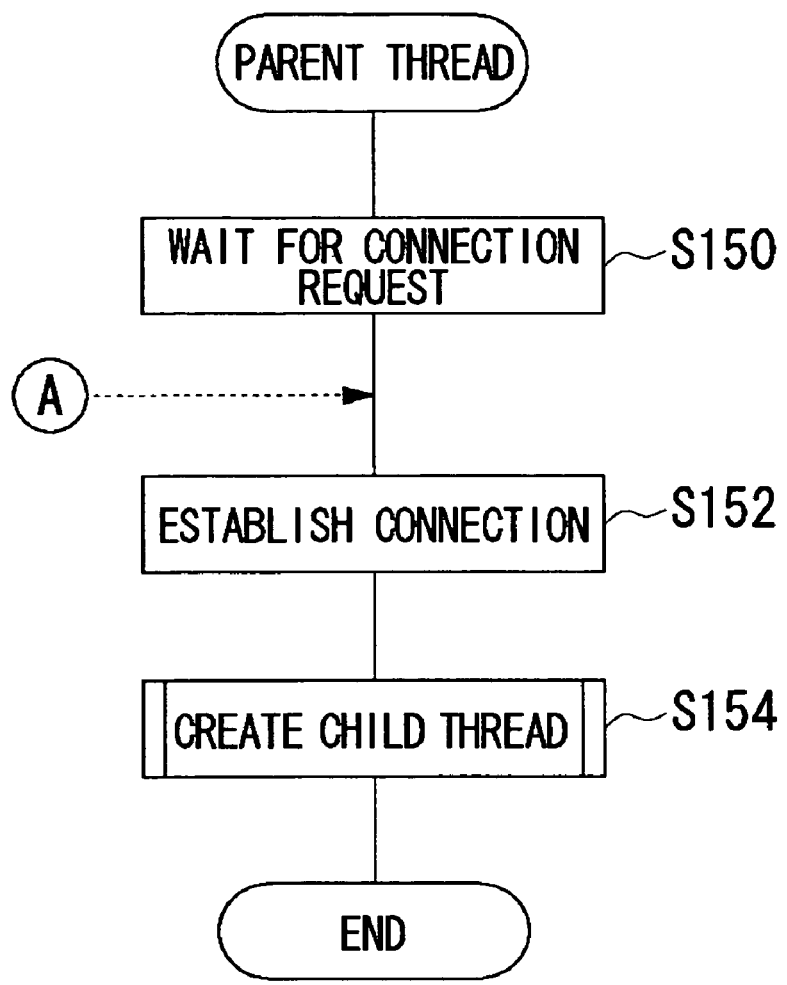
FIG. 11 is a flowchart of a parent thread on the file server.

FIG. 11 shows the processing flow by which the file server 100 exchanges images with the digital camera 10. The file server 100 is typically on the parent thread, waiting for the request for a network connection from the digital camera 10 (S150). When the digital camera 10 requests a network connection with the file server 100 in its activation process (A at S32 of FIG. 6), the file server 100 receives the network connection request command and transmits a response command to establish the network connection (S152). Then, it creates a child thread (S154).

Figure 12:
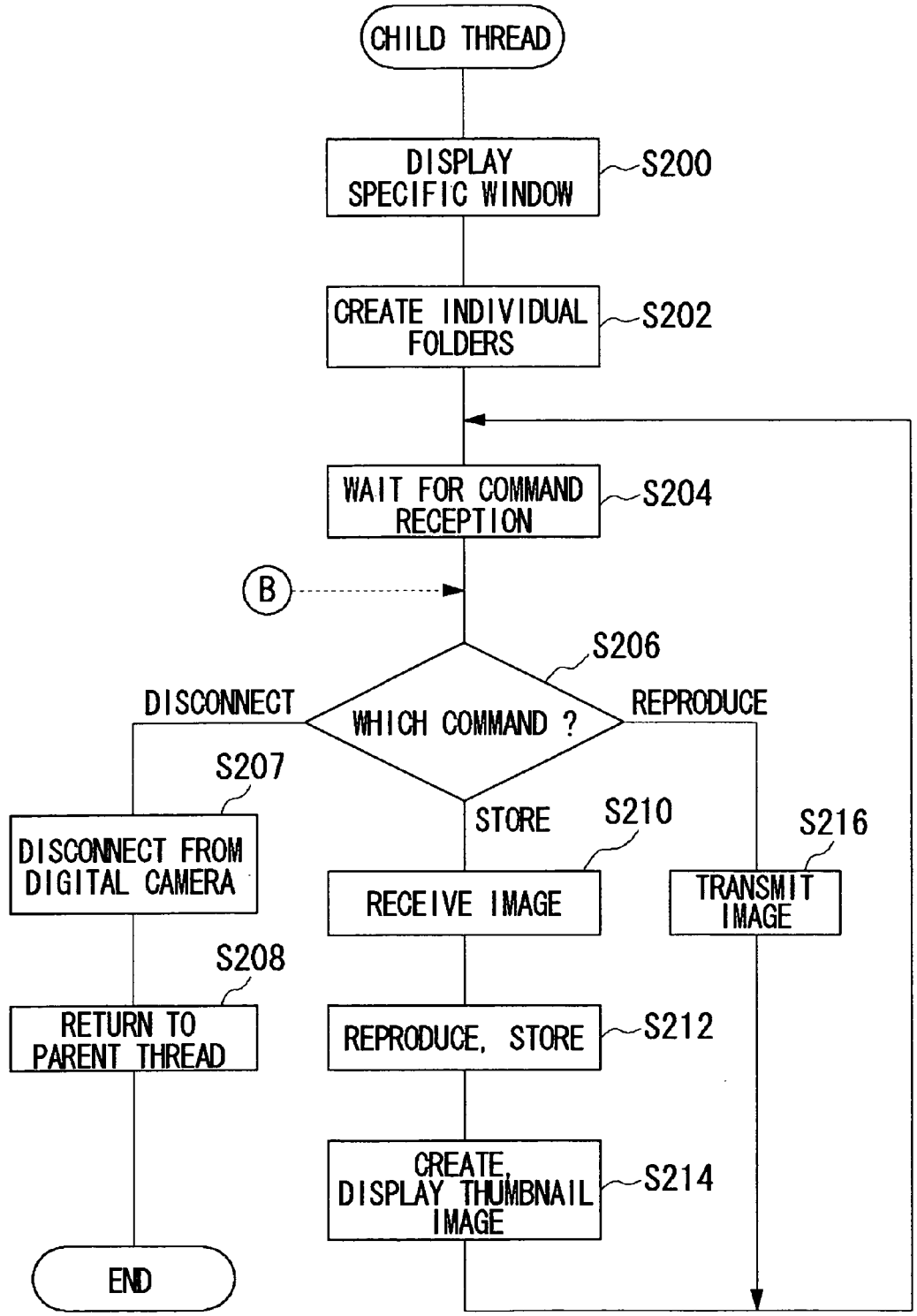
FIG. 12 is a flowchart of a child thread on the file server.

FIG. 12 shows the processing flow of the child thread. Initially, the reproduction processing unit 106 of the file server 100 displays a window specific to the digital camera 10 or the user (S200). The file management unit 108 creates individual folders (S202). Then, the child thread waits for reception of a command from the digital camera 10 (S204). Commands are transmitted from the digital camera 10 in any of the cases that: an image is transmitted in the storing process of FIG. 7 (S46); an image is received in the reproduction process of FIG. 9 (S88); and the network connection is disconnected in the termination process of FIG. 10 (S106). The file server 100 receives these commands.

If the received command is a request to disconnect the network connection ("DISCONNECT" at S206), the network connection with the digital camera 10 is disconnected (S207) and the processing returns to the parent thread (S208). If the command is a request to store an image ("STORE" at S206), the communication unit 102 receives the image (S210). The reproduction processing unit 106 reproduces the image and the file management unit 108 stores the image data (S212). For an optional function, the file management unit 108 also creates and stores a thumbnail image, and the reproduction processing unit 106 displays this thumbnail image (S214). The processing then returns to the wait for command reception (S204).

If the command received at S206 is a request to reproduce an image ("REPRODUCE" at S206), the file management unit 108 reads the image to be reproduced from the image storing apparatus 110 and transmits the same to the digital camera 10 (S216). The processing then returns to the wait for command reception (S204).

Figure 13:
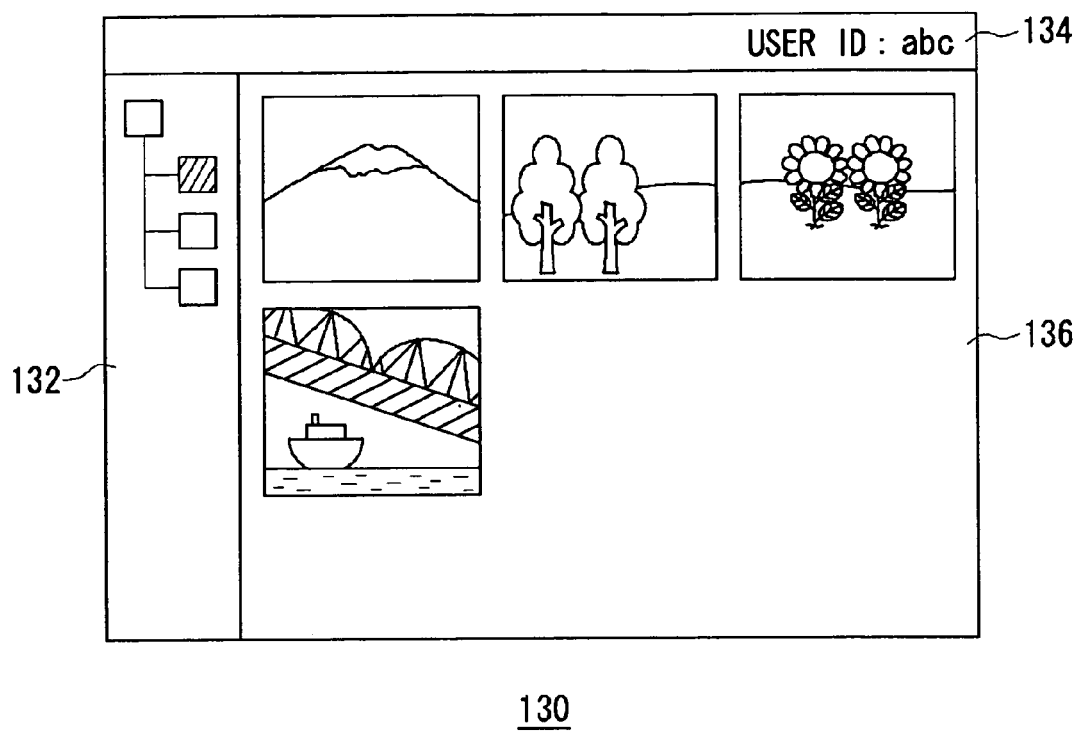
FIG. 13 is a diagram showing an example of display on a screen of the display on the file-server side.

FIG. 13 shows an example of display on a screen 130 of the display 112 on the part of the file server 100. The screen 130 is provided with areas 132, 134, and 136. The area 132 shows the structure of the folders created by the file management unit 108. The area 134 shows the identification information of the digital camera 10 or the ID of the user. The area 136 displays images reproduced by the reproduction processing unit 106. The identification information of the digital camera 10 is recorded, for example, on the flash memory 60, a not-shown boot ROM, or any other area. At the time of communication with the file server 100, the identification information can be transmitted for identification.

The user can view on this screen 130 the folder in his/her own use. Successive display of shot images facilitates checking the images. The folders are managed individually by digital camera 10 or by user. This eliminates the possibility that the images get mixed with ones shot by others.

As has been described, according to the present embodiment, the user can readily grasp the images shot in succession and manage his/her images on the file server 100 efficiently. When the user terminal 124 functions also as the file server 100 and is configured as a note PC or the like, the operability problem of the digital camera 10 can be solved since it is typically possible to edit or otherwise manipulate the images more easily by using such means as a mouse than with the digital camera 10. Moreover, the images shot by the digital camera 10 are stored directly into the file server 100 or the memory card. Thus, the digital camera 10 itself need not have a large memory for image storing. This also results in cost advantage. Besides, the user need not be aware of the storing destination of the images, which means easier operations. Because of these advantages, the user can experience a maximum merit of the digital technology.

Up to this point, the present invention has been described in conjunction with the embodiment. It will be readily understood by those skilled in the art, however, that this embodiment is for illustrative purpose only and is capable of various modifications, and all such modifications are intended to fall within the scope of the present invention. The following provides some of the modifications.

In the embodiment, the network connection between the digital camera 10 and the file server 100, the storing of images from the digital camera 10 to the file server 100, and the transmission of images from the file server 100 to the digital camera 10 are all performed automatically without a wait for explicit user instructions. Nevertheless, any of these operations may be performed after a wait for explicit user instructions. For example, the operation block 18 may be provided with not-shown various setting facilities so that a predetermined button in a predetermined setting mode is assigned to the establishment of the network connection. Similarly, the function of selecting the storing destination of an image from among the file server 100, a memory card, and the buffer 56 explicitly may be provided.

In the embodiment, the network connection with the file server 100 is established by the cooperation between the communication control unit 72 and the communication card in the activation process alone. In consideration of the cases where the connection cannot be established in the activation process, however, the network establishment may be retried at timing other than the activation processing or upon event occurrence if the establishment of the network connection fails. For example, retries may be made at timer settings. Retries may also be made in the storing process and/or reproduction process. When communication fails due to an incomplete connection with the access point of the wireless LAN, the communication control unit 72 or the communication card may establish a network connection upon detecting a beacon from the wireless LAN.

In FIG. 6, the storing process (S36) is performed in the activation process. Nevertheless, the activation process may be ended with establishing the connection with the file server 100, skipping the processing of S34 and S36. In this case, the activation process completes in a shorter period of time.

In the embodiment, the buffer 56 is incorporated into the flash memory 60, whereas it may be part of the main memory 46. In this case, it is desirable that the image data be transferred from the main memory 46 to the file server 100 or the memory card before the digital camera 10 is powered off, or that the main memory 46 be kept energized for image retention even during power-off.

In the embodiment, in the shooting process of FIG. 8, the image remaining in the buffer 56 is stored before the shot image. The reason is to store the images just in the order of shooting. Nevertheless, the shot image may be stored before the image remaining in the buffer 56 if the correspondence between the order of shooting and the order of storing does not matter. In this case, the processing of S62 to S66 and the processing of S36B to S70 may be replaced with each other in FIG. 8.

In the embodiment, data yet to be stored in the termination process of FIG. 10, if any, is saved to the buffer 56 (S102). Nevertheless, in the presence of a memory card, the data yet to be stored may be stored into the memory card. In the presence of a communication card, the data yet to be stored may be stored into the file server 100. The saving to the buffer 56 can typically complete the termination process faster. The storing to the memory card or the file server 100 can secure free space in the buffer 56. For still faster completion of the termination process of FIG. 10, an alternative is to discard the data yet to be stored, i.e., skip S100 and S102.

According to the present invention, greater merits of digital technology can be reflected on the digital camera.

Although the present invention has been described by way of exemplary embodiments, it should be understood that many changes and substitutions may be made by those skilled in the art without departing from the spirit and the scope of the present invention which is defined only by the appended claims.

What is claimed is:

1. A digital camera comprising:
    an image pickup block;
    a mechanism control block which controls the image pickup block mechanically;
    an operation block which inputs a user operation; and
    a processing block which applies processing to an image, the processing block including a detecting unit which detects an activation request for the digital camera, and a communication control unit which performs processing for establishing a network connection with a file server upon detection of the activation request; further comprising
    a memory card control unit which controls a memory card when an option slot is loaded with the memory card; and
    a card identification unit which identifies a card loaded in the option slot, and wherein
    when the option slot is loaded with a memory card, the memory card control unit performs image storing and read with the memory card as a recording medium, and
    when the option slot is loaded with a communication card, the communication control unit performs image storing and read via the communication card with the file server as a recording medium.

2. A digital camera comprising:

an image pickup block;

a mechanism control block which controls the image pickup block mechanically;

an operation block which inputs a user operation; and a processing block which applies processing to an image, the processing block including a detecting unit which detects an image pickup request, and a communication control unit which performs processing for transmitting an image obtained by image pickup to a file server over a network upon obtainment of the image; further comprising a memory card control unit which controls a memory card when an option slot is loaded with the memory card; and a card identification unit which identifies a card loaded in the option slot, and wherein when the option slot is loaded with a memory card, the memory card control unit performs image storing and read with the memory card as a recording medium, and when the option slot is loaded with a communication card, the communication control unit performs image storing and read via the communication card with the file server as a recording medium.

3. A digital camera comprising:

an image pickup block;

a mechanism control block which controls the image pickup block mechanically;

an operation block which inputs a user operation; and a processing block which applies processing to an image, the processing block including a detecting unit which detects an image reproduction request, a communication control unit which performs processing which receives an image to be reproduced from a file server over a network when the image reproduction request is detected, and a reproduction processing unit which reproduces the image received from the file server; further comprising a memory card control unit which controls a memory card when an option slot is loaded with the memory card; and a card identification unit which identifies a card loaded in the option slot, and wherein when the option slot is loaded with a memory card, the memory card control unit performs image storing and read with the memory card as a recording medium, and when the option slot is loaded with a communication card, the communication control unit performs image storing and read via the communication card with the file server as a recording medium.

4. The digital camera according to claim 1, further comprising: a buffer memory; and a buffer processing unit which saves an image to the buffer memory when transmission of the image to the file server fails, and wherein the buffer processing unit reads an image already saved in the buffer memory, if any, when an image obtained by shooting is transmitted to the file server, and wherein the communication control unit transmits the image read by the buffer processing unit and the image obtained by shooting to the file server in this order.

5. The digital camera according to claim 2, further comprising: a buffer memory; and a buffer processing unit which saves an image to the buffer memory when transmission of the image to the file server fails, and wherein the buffer processing unit reads an image already saved in the buffer memory, if any, when an image obtained by shooting is transmitted to the file server, and wherein the communication control unit transmits the image read by the buffer processing unit and the image obtained by shooting to the file server in this order.

6. The digital camera according to claim 3, further comprising: a buffer memory; and a buffer processing unit which saves an image to the buffer memory when transmission of the image to the file server fails, and wherein the buffer processing unit reads an image already saved in the buffer memory, if any, when an image obtained by shooting is transmitted to the file server, and wherein the communication control unit transmits the image read by the buffer processing unit and the image obtained by shooting to the file server in this order.

* * * * *